United States Patent Office 3,222,784
Patented Dec. 14, 1965

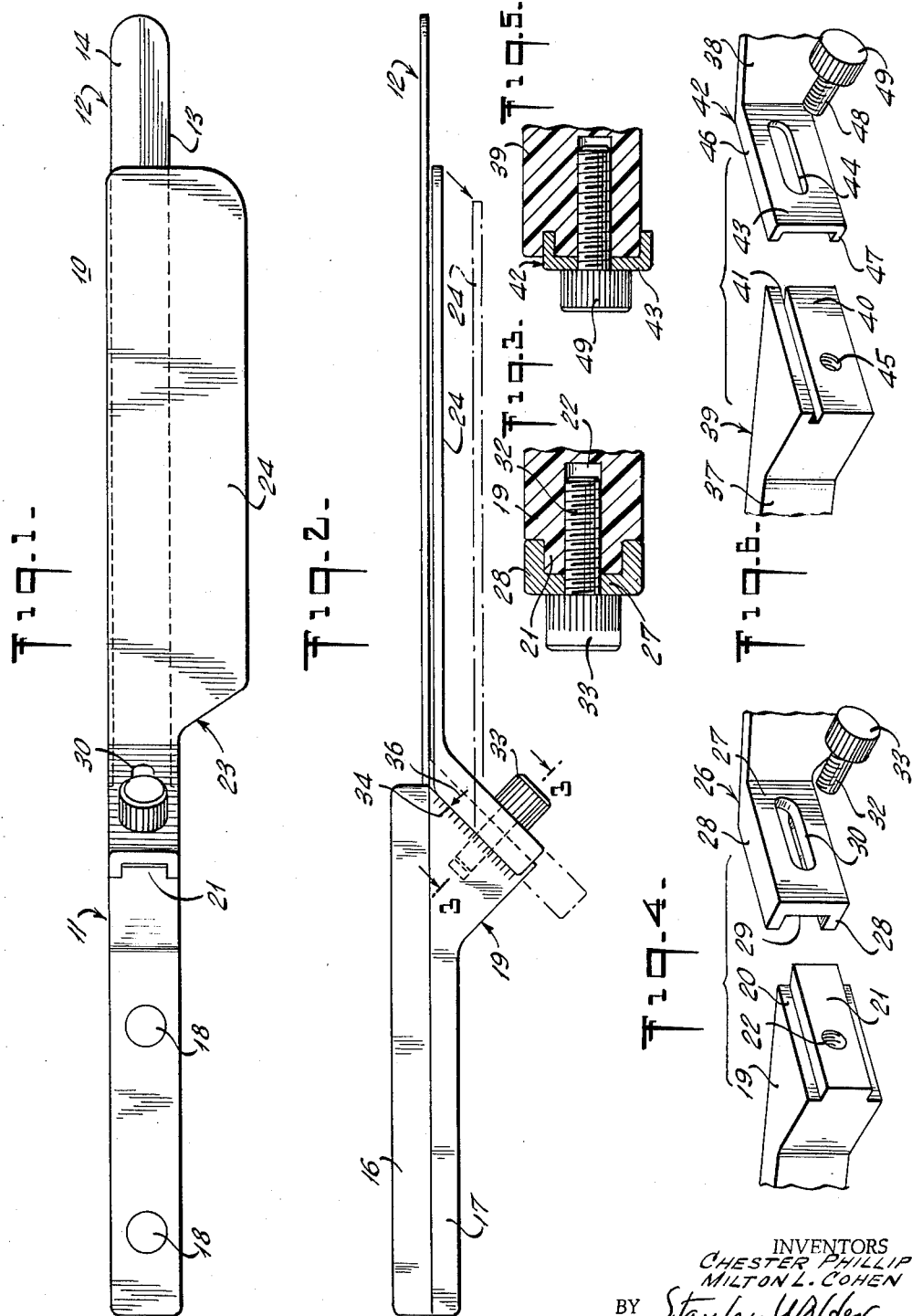

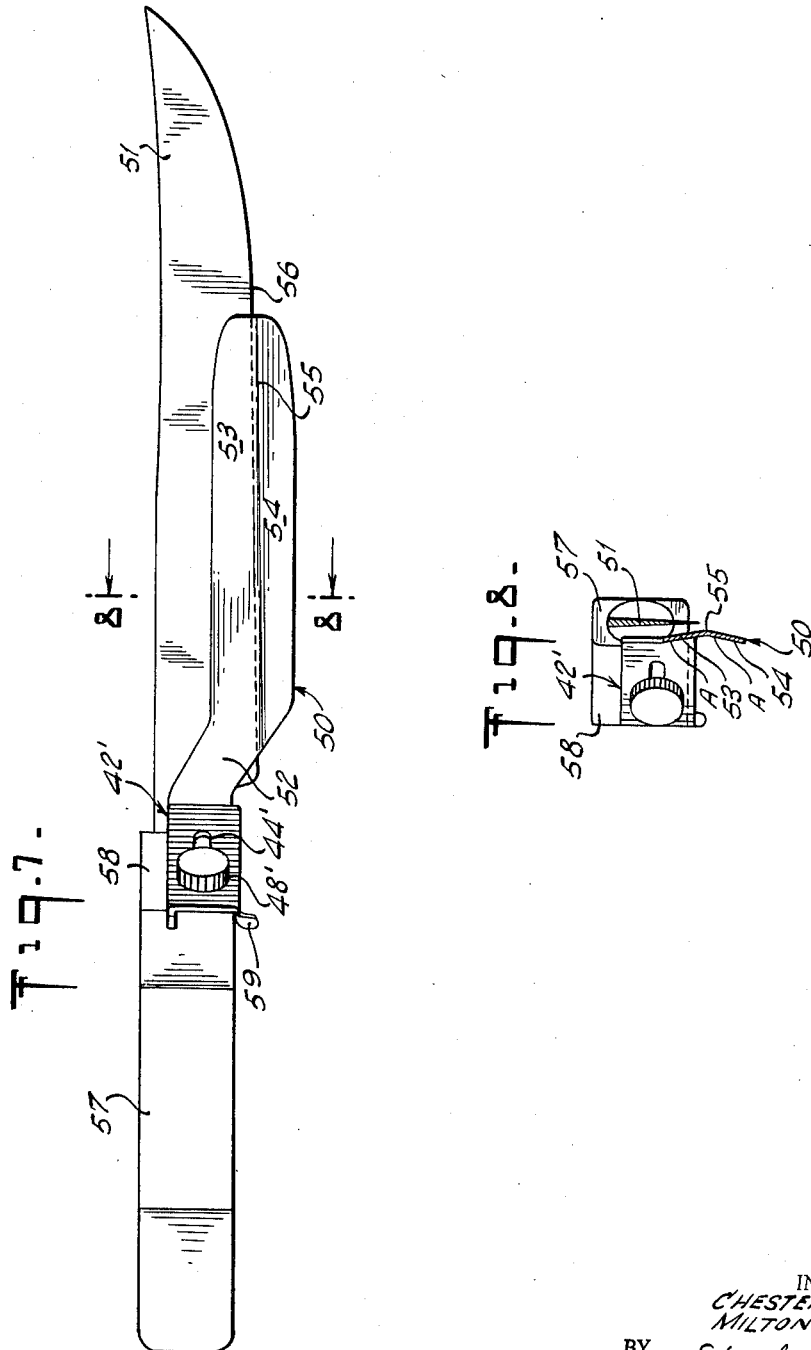

3,222,784
ADJUSTABLE GUIDED SLICING KNIFE
Chester Phillips, 761 Hylan Blvd., Staten Island, N.Y.,
and Milton L. Cohen, 652 Park Lane, Cedarhurst, N.Y.
Filed May 24, 1963, Ser. No. 283,031
4 Claims. (Cl. 30—293)

The present invention relates generally to improvements in slicing and cutting devices and it relates more particularly to an improved adjustable slicing knife provided with gauge means for facilitating the cutting of uniform slices.

In the cutting or slicing of many foodstuffs such as meats, fish, vegetables, breads, cakes and the like it is frequently desirable to cut the foodstuff into uniform slices of predetermined thickness. This result is difficult to achieve with the use of the unaided conventional knife except by those who are highly skilled and expert in the field. Where the slicing is performed by the average housewife, not only are the slices, particularly in the thin slicing of meats, uneven, but they are rarely of uniform thickness. Many types of gauge type knives having guide members have been proposed in an effort to facilitate the uniform slicing of foodstuffs but the devices heretofore available possess many drawbacks and disadvantages. They are complex, awkward and expensive devices. They are difficult to adjust, subject to malfunctioning, difficult to wash and keep clean and otherwise leave much to be desired.

It is thus a principal object of the present invention to provide an improved cutting and slicing device.

Another object of the present invention is to provide an improved knife for slicing foodstuffs such as meats, fish, breads, cakes, vegetables, fruits and the like.

Still another object of the present invention is to provide an improved food slicing knife provided with means for gauging the slice thickness.

A further object of the present invention is to provide an improved adjustable gauge slicing knife.

Still a further object of the present invention is to provide an adjustable slicing knife of the above nature characterized by its simplicity, ruggedness, reliability, ease of use and low cost.

The above and other objects of the present invention will become apparent from a reading of the following description taken in conjunction with the accompanying drawing, wherein:

FIGURE 1 is a side elevational view of a knife embodying the present invention;

FIGURE 2 is a top plan view thereof the gauge member being illustrated by broken line in an alternative position;

FIGURE 3 is a sectional view taken along line 3—3 in FIGURE 2;

FIGURE 4 is an enlarged fragmentary exploded perspective view thereof illustrating in detail the gauge plate coupling arrangement;

FIGURE 5 is a sectional view similar to FIGURE 3 of another embodiment of the present invention;

FIGURE 6 is a fragmentary exploded perspective view thereof;

FIGURE 7 is a side elevational view similar to FIGURE 1 of still another embodiment of the present invention; and FIGURE 8 is an end view thereof.

In a sense the present invention contemplates the provision of an adjustable slicing knife comprising a longitudinally extending blade having a cutting edge along the bottom thereof and longitudinally extending opposite-side faces, a rearwardly directed handle member affixed at its leading end to one end of said cutting blade, a first coupling member located on the side of said handle adjacent to the leading end thereof and having a forwardly directed coupling face forming a predetermined obtuse angle to said cutting blade, a longitudinal extending gauge bar parallel to and laterally spaced from a side face of said cutting blade, a second coupling member affixed to the trailing end of said gauge bar and longitudinally movable relative to said first coupling member and having a rearwardly directed second coupling face engaging said first coupling face and forming an angle with said guide bar substantially equal to said predetermined angle, and means releaseably locking said coupling members against relative movement.

According to a preferred form of the present invention, the guide bar is in the form of a plate having a vertical face confronting and parallel to a side face of the cutting blade and depending below the cutting edge thereof, the second coupling member projecting rearwardly from the trailing upper end of the gauge plate. A longitudinal ridge is formed on the first coupling face and a longitudinal groove is formed in the second coupling face and slidably engages the said ridge. A longitudinal slot is formed in the second coupling member and registers with the groove. A lock screw registers with the slot and engages a tapped bore in the first coupling member to permit the lateral adjustment of the gauge plate relative to the cutting blade.

Referring now to the drawing, and more particularly FIGURES 1 to 4 thereof which illustrate a preferred embodiment of the present invention, the reference numeral 10 generally designates the improved adjustable slicing knife which includes a handle member 11 and a cutting blade 12. The blade 12 extends longitudinally and has a bottom cutting edge 13 and vertical side faces 14. The cutting blade 12 is affixed to the handle 11 in any conventional manner and may be provided with a readwardly directed shank embraced between the confronting faces of two longitudinally coextensive sections 16 and 17 forming the handle 11. A pair of spaced fasteners such as rivets 18 engage the handle sections 16 and 17 and the blade shank to secure the assembly thereof. Of course other means may be employed to anchor the blade shank in the handle 11.

The handle 11 may be formed of any suitable material such as a wood, a synthetic organic polymeric resin or the like.

A first coupling member 19 of substantially triangular prismatic configuration is located on the side face of the handle section 17 at the leading end thereof and may be formed integrally therewith. The coupling member 19 includes an inclined front face 20 which faces forwardly and forms an obtuse angle to the longitudinal axis of the cutting blade 12. Extending longitudinally along the length of and medially located on the coupling member face 20 is a ridge or rib 21 of rectangular transverse cross section. A tapped bore 22 is formed in the coupling member 19 perpendicular to the face 20 and located along the medial axis of the rib 21 between the ends thereof.

In order to properly guide the knife 10 in the slicing operation there is provided a gauge member 23 which includes a gauge plate 24 laterally adjustably supported in laterally spaced parallel relationship to the cutting blade 12. The gauge plate 24 is of approximately rectangular configuration having rounded corners and extending longitudinally a short distance less than the full length of the blade 12. The upper edge of the gauge plate 24 is at about the level of the upper edge of the blade 12 and the lower edge thereof is considerably below the blade cutting edge 13. The face of the gauge plate 24 confronting the blade side face 14 is advantageously flat and vertical and parallel to the face 14.

Projecting rearwardly from the upper trailing corner of the gauge plate 24 and preferably formed integrally therewith is a second coupling member 26 which mates the first coupling member 19 and is longitudinally adjustable thereon. The coupling member 26 is substantially channel shaped and forms an obtuse angle with the gauge plate 24 substantially equal to the angle of the face 20 and rib 21 to the cutting blade longitudinal axis. The coupling member 26 includes a cross web 27 overlying the top face of the rib 21 and side legs 28 embracing the sides of the rib 21. Thus the legs 28 and cross web 27 delineate a longitudinal groove 29 which is longitudinally slidably engaged by the rib 21 and prevents any angular movement of the coupling member 26 and the gauge plate 24. The gauge member 23 may be formed of a metal, a synthetic organic polymeric resin or other suitable material.

A longitudinally extending slot 30 is formed in and along the medial axis of the cross web 27 and registers with the tapped bore 22. A lock thumb screw 32 projects through the slot 30 and engages the tapped bore 22. The lock screw 32 is provided with a knurled head 33 which bears upon the cross web 27 and permits the manipulation of the lock screw between a lock and a release position. It should be noted that a suitably graduated scale 34 and an indicating arrow 36 may be located along the adjacent edges of the top faces of the coupling members 19 and 26 to provide an indication of knife slicing thickness.

In employing the slicing knife 10 described above, the gauge member 23 is first adjusted to correspond to the desired slicing thickness by first loosening the thumb screw 32 to permit such adjustment. The coupling member 26 is then slid along the coupling member 19 until the desired lateral spacing between the gauge plate 24 and the cutting blade 42 is effected and the thumb screw 32 is then tightened to lock the plate 24 in its selected position. It should be noted that in any laterally adjusted position of the gauge plate 24, it is parallel to the blade 12 and maintains a constant orientation relative thereto. Furthermore a fine and accurate adjustment of the gauge plate may be achieved by reason of the inclination of the sliding mating surfaces of the coupling members 19 and 26, since the lateral movement of the gauge plate 24 is a fraction of the relative longitudinal movement of the coupling members, the greater the obtuse angle of these surfaces to the longitudinal axis, the smaller this fraction. The adjusted knife may then be used for slicing by applying the guide surface of the gauge plate 24 to the face of the material to be sliced and then proceeding with the slicing action with the gauge plate sliding along the face of the material being sliced.

In FIGURES 5 and 6 of the drawing there is illustrated another embodiment of the present invention differing from that first described only in the structure of the adjustable coupling arrangement between the knife and the gauge member. Specifically the slicing knife includes a handle section 37 and a gauge plate 38 corresponding to the handle section 17 and gauge plate 24, respectively, as well as the associated cutting blade and opposite handle section earlier described.

Located on the leading outer face of the handle section 37 and formed integrally therewith is a first coupling member 39 of substantially triangular prismatic configuration and provided with a front face 40 forming an obtuse angle to the longitudinal axis of the cutting blade as in the first embodiment. A longitudinally extending groove 41 is formed in the front face 40 spaced shortly inwardly of and parallel to a longitudinal edge of the front face 40. Also formed in the front face 40 and substantially centrally thereof is a tapped bore 45 perpendicular to the front face 40.

The gauge plate 38 terminates at its upper trailing end in a second coupling member 42 formed integrally therewith. The coupling member 42 is of channel shape including a cross-web 43 forming an angle with the gauge blade 38, complementing that of the coupling member front face 40 and having a medially located longitudinal slot 44 formed therein. Projecting from the web 43 are upper and lower legs 46 and 47 respectively, the upper leg 46 slidably engaging and mating the groove 41 and the lower leg slidably abutting the underface of the first coupling member 39. A thumb screw 48 provided with a knurled head 49 registers with the slot 44 and engages the tapped bore 45 to effect the assembly and releasable locking of the coupling members 39 and 42 in a preselected position and permit the adjustment of the gauge plate 38.

The operation of the adjustable slicing knife last described is similar to that first described. Moreover, the coupling members may be provided with indexing marks corresponding to the indicia and arrow 34 and 36.

In FIGURES 7 and 8 of the invention there is illustrated still another embodiment of the present invention, which is similar to the embodiment shown in FIGURES 5 and 6. The changes in this third embodiment from that of the second consists of changes in the gauge plate to enable the device to be used in cases where the material being cut has a tendency to bind in the two previous embodiments. Materials having a relatively high coefficient of friction will demonstrate such binding.

In this third embodiment the gauge plate 50 remains parallel to cutting blade 51, but said plate at its trailing end includes an inclined neck 52 the net effect of which is to effectively depress gauge plate 50 from the position shown in the prior embodiments relative to the cutting blade 51 and relative to the second coupling member 42'. The substantially vertical surfaces 53 and 54 of gauge plate 50 are inclined to one another to form an outwardly facing obtuse dihedral angle A along the line 55, said line being parallel to cutting blade 51 running proximate to but below the cutting edge 56 which it confronts on the side opposite to that in which the dihedral angle is formed.

In other respects, with one exception to be noted, this last embodiment contains members which are substantially the same as those of the second embodiment illustrated in FIGURES 5 and 6, there being a handle 57 which receives blade 51, a first coupling member 58 on the side face of handle 57, and the slot 44' and lock screw 48' which, with the same means, not shown, provide means to releasably lock the first and second coupling members. The exception above stated is the addition of tab 59 which extends to the rear from the lower trailing end of the second coupling 42' and downwardly thereof. Its function is to provide a means for grasping second coupling member 42' and thus avoid the tendency to come in contact with cutting edge 56 when adjusting the position of gauge plate 50.

In operation and adjustment the last described embodiment is identical to that of the prior embodiments.

While there has been described and illustrated a preferred embodiment of the present invention it is apparent that numerous alterations, omissions and additions may be made without departing from the spirit thereof.

What is claimed is:

1. An adjustable slicing knife comprising a longitudinally extending blade having a cutting edge along the bottom thereof and longitudinally extending opposite side faces, a rearwardly directed handle member affixed at its leading end to one end of said cutting blade, a first coupling member located on the side of said handle adjacent to the leading end thereof and having a forwardly directed coupling face forming a predetermined obtuse angle to one of the side faces of said cutting blade, a longitudinally extending gauge bar parallel to and laterally spaced from a side face of said cutting blade, a second coupling member affixed to the trailing end of said gauge bar and longitudinally movable relative to said first coupling member and having a rearwardly directed second coupling face engaging said first coupling face and forming an angle with said gauge bar substantially equal to said predetermined angle, and means secured to said coupling members releasably locking said coupling members against relative movement.

2. An adjustable slicing knife comprising a longitudinally extending blade having a cutting edge along the bottom thereof and longitudinally extending opposite-side faces, a rearwardly directed handle member affixed at its leading end to one end of said cutting blade, a first coupling member located on the side of said handle adjacent to the leading end thereof and having a forwardly directed coupling face forming a predetermined obtuse angle to one of the side faces of said cutting blade, said first coupling face having a longitudinally extending ridge formed thereon, a longitudinally extending gauge plate having a vertical face parallel to and laterally spaced from and confronting a side face of said cutting blade and depending below the cutting edge thereof, a second coupling member affixed to the upper trailing end of said gauge plate and having a rearwardly directed second coupling face engaging said first coupling face and forming an angle with said gauge plate substantially equal to said predetermined angle and having a longitudinal groove formed therein engaging said ridge, said second coupling member having a longitudinal slot formed therein registering with said coupling members against relative movements having a shank registering with said slot and engaging said first coupling member.

3. An adjustable slicing knife comprising a longitudinally extending blade having a cutting edge along the bottom thereof and longitudinally extending opposite side faces, a rearwardly directed handle member affixed at its leading end to one end of said cutting blade, a first coupling member located on the side of said handle adjacent to the leading end thereof and having a forwardly directed coupling face forming a predetermined obtuse angle to one of the side faces of said cutting blade, said first coupling face having a longitudinal groove formed therein spaced inwardly and parallel to a longutudinal edge of said coupling face, a longitudinally extending gauge plate having a vertical face parallel to and laterally spaced from and confronting a side face of said cutting blade and depending below the cutting edge thereof, a second coupling member affixed to the upper trailing end of said gauge plate and having a rearwardly directed second coupling face engaging said first coupling face and forming an angle with said gauge plate substantially equal to said predetermined angle and provided with rearwardly directed flanges slidably engaging said groove and said longitudinal edge of said first coupling face, and means secured to said coupling members releasably locking said coupling members in a preselected position.

4. An adjustable slicing knife as described in claim 1 said gauge plate having a pair of substantially vertical surfaces forming an obtuse dihedral angle on the face thereof opposite the face confronting said blade.

References Cited by the Examiner

UNITED STATES PATENTS

| 122,934 | 1/1872 | Bruen | 30—284 |
| 2,838,078 | 6/1958 | Cusanza | 143—174 |
| 3,057,058 | 10/1962 | Sidney et al. | 30—293 X |
| 3,095,646 | 7/1963 | Szekely | 30—283 |

FOREIGN PATENTS

| 451,684 | 10/1927 | Germany. |
| 745,170 | 2/1956 | Great Britain. |

WILLIAM FELDMAN, *Primary Examiner.*

MILTON S. MEHR, *Examiner.*